United States Patent Office 2,941,939
Patented June 21, 1960

2,941,939

REMOVAL OF METALLIC IMPURITIES FROM LIGHT HYDROCARBON OILS WITH BORON TRIFLUORIDE COORDINATION COMPOUNDS

Chyn Duog Shiah, 189 Nassau Ave., Manhasset, N.Y.

No Drawing. Filed Mar. 7, 1956, Ser. No. 569,956

7 Claims. (Cl. 208—241)

This invention relates to the treatment of hydrocarbon oils and is more particularly concerned with the treatment of catalytic reforming charging stock to remove undesired components therefrom.

The rapid acceptance of catalytic reforming as a basic processing tool in the petroleum industry during the past six years is well known. Today, the total estimated processing capacity is over one million barrels per day. In general, the several processes employed commercially for catalytic reforming employ platinum and/or other precious metals as catalyst. Unfortunately, however, these catalysts are highly sensitive to poisoning, particularly by lead and arsenic. As a consequence, elaborate and generally expensive pretreatment methods have been devised to prepare the charging stock for the catalytic reforming step. These pretreatment methods, for the most part, involve clay or hydrogen treatment and add substantially to the total cost of processing. The quantity of metallic contaminants is not great but these prior pretreatment methods are inherently complex and expensive as well as being time consuming and require large quantities of reagents. There is, therefore, an important need for a means of pretreatment of catalytic reformer charge stock which is effective to reduce the metallic content of the stock to a value which does have an adverse poisoning action upon the oil.

It is the principal object of the present invention to provide a process for refining catalytic reforming charging stock which is rapid and efficient and which requires only small quantities of reactants.

It is a further object of the invention to provide a process of the character indicated which avoids the drawbacks and disadvantages of prior methods employed for the pretreatment of catalytic reforming charging stock.

It is another object of the invention to provide an inexpensive, highly-efficient method for reducing the content of metal compounds in naphthas and similar light petroleum fractions.

In accordance with the invention, there is provided a process for substantially reducing the quantity of metallic catalyst poisons from a light hydrocarbon oil, more particularly a catalytic reforming charging stock, which comprises treating the oil with a small amount of a boron fluoride coordination compound to effect a separation of the metal compounds of the oil from the main body of the oil. The boron fluoride coordination compound and the associated metal compounds of the oil stratify as a reactant phase and the refined hydrocarbon oil with a trace of the $BF_3$ coordination compound forms a purified phase. The reactant phase can be easily separated from the purified phase by centrifuging, decantation, or other convenient means. The purified phase, after removal of any traces of $BF_3$ coordination compound, which is readily effected, is then ready for catalytic reforming and, because of its very low content of metallic catalyst poisons, has little adverse effect upon the reforming catalyst. The boron fluoride coordination compound is also readily recovered from the reactant phase so that almost all of the coordination compound originally employed in the treatment of the contaminated oil is available for reuse in the treatment of a further quantity of oil. In general, my process is applicable to the treatment of light hydrocarbon oils of the character indicated containing more than 40 parts per billion of catalyst poisoning metal compounds and the process is effective to reduce content of such compounds to at least 50%, viz. to less than 20 parts per billion.

The boron fluoride coordination compound is used in an amount corresponding to at least 0.1% by volume, preferably 0.5 to 25% by volume of the oil treated, and is intimately mixed with the hydrocarbon oil for a short period of time, e.g. one-half minute to thirty minutes, and the oil is then separated from the boron fluoride reaction products. The reactant stratum is readily separated, by decantation, centrifuging or other convenient means, from the purified stratum and the boron fluoride coordination compound is easily separated from the reactant phase by methods outlined below.

I employ coordination compounds of boron fluoride with alcohols, ethers, ketones, esters, acid anhydrides, aldehydes and nitrogen compounds such as ammonia, amines, amides, amino alcohols and anilides. Examples of suitable boron fluoride coordination compounds with alcohols are:

Methyl alcohol boron fluoride ($BF_3.CH_3OH$)
Ethyl alcohol boron fluoride ($BF_3.CH_3CH_2OH$)
Propyl alcohol boron fluoride ($BF_3.CH_3CH_2CH_2OH$)
Butyl alcohol boron fluoride ($BF_3.CH_3(CH_2)_2CH_2OH$)
Phenol boron fluoride ($BF_3.C_6H_5OH$)
Cresol boron fluoride ($BF_3.CH_3C_6H_4OH$)

Examples of suitable boron fluoride coordination compounds with ethers are:

Dimethylether boron fluoride ($BF_3.(CH_3)_2O$)
Diethylether boron fluoride ($BF_3.C_2H_5OC_2H_5$)
Methylethylether boron fluoride ($BF_3.CH_3OC_2H_5$)
Methylpropylether boron fluoride $$(BF_3.CH_3OCH_2CH_2CH_3)$$

Ethyl isopropylether boron fluoride $$(BF_3.C_2H_5OCH(CH_3)_2)$$

Examples of boron fluoride coordination compounds with ketones suitable for use in accordance with my invention are:

Acetone boron fluoride ($BF_3.CH_3COCH_3$)
Methylethylketone boron fluoride ($BF_3.CH_3COC_2H_5$)
Diethylketone boron fluoride ($BF_3.C_2H_5COC_2H_5$)

Examples of suitable boron fluoride coordination compounds with esters are:

Methyl formate boron fluoride ($BF_3.HCOOCH_3$)
Ethyl formate boron fluoride ($BF_3.HCOOC_2H_5$)
Ethyl acetate boron fluoride ($BF_3.CH_3COOC_2H_5$)
Ethyl propionate boron fluoride ($BF_3.CH_3CH_2COOC_2H_5$)
Methyl benzoate boron fluoride ($BF_3.C_6H_5COOCH_3$)

Examples of suitable boron fluoride coordination compounds with acid anhydrides are:

Propionic anhydride boron fluoride $$(BF_3.(CH_3CH_2CO)_2O)$$

Butyric anhydride boron fluoride $$(BF_3.(CH_3CH_2CH_2CO)_2O)$$

Isobutyric anhydride boron fluoride $$(BF_3.(CH_3)_2CHCO)_2O)$$

Examples of suitable boron fluoride coordination compounds with aldehydes are:

Acetaldehyde boron fluoride (BF$_3$.CH$_3$CHO)
Chloral boron fluoride (BF$_3$.CCl$_3$CHO)
Phenyl acetaldehyde boron fluoride (BF$_3$.C$_6$H$_5$CH$_2$CHO)

Examples of suitable boron fluoride coordination compounds with acids are:

Formic acid boron fluoride (BF$_3$.HCOOH)
Acetic acid boron fluoride (BF$_3$.CH$_3$COOH)
Propionic acid boron fluoride (BF$_3$.CH$_3$CH$_2$COOH)
Salicylic acid boron fluoride (BF$_3$HOC$_6$H$_4$COOH)
Benzoic acid boron fluoride (BF$_3$.C$_6$H$_5$COOH)

Examples of suitable boron fluoride coordination compounds with nitrogen compounds, e.g. ammonia, amines, amides, anilides, and amino alcohols, are:

Ammonia boron fluoride (BF$_3$.NH$_3$)
Methylamine boron fluoride (BF$_3$.CH$_3$NH$_2$)
Aniline boron fluoride (BF$_3$.C$_6$H$_5$NH$_2$)
Ethanolamine boron fluoride (BF$_3$.NH$_2$CH$_2$CH$_2$OH)
Acetanilide boron fluoride (BF$_3$.CH$_3$CONHC$_6$H$_5$)
Propionamide boron fluoride (BF$_3$.CH$_3$CH$_2$CONH$_2$)
Urea boron fluoride (BF$_3$.CO(NH$_2$)$_2$.)
Dimethyl formamide boron fluoride (BF$_3$.HCOON(CH$_3$)$_2$)

The boron fluoride coordination compounds which I employ should be either liquid or solid at normal room temperatures, i.e. 20° C. If the coordination compound is a liquid, it should have a specific gravity greater than 1, and should preferably vaporize below 140° C. at 760 mm. pressure. Solid coordination compounds are suitable if they are non-hydroscopic and relatively stable.

While any boron fluoride coordination compounds falling within the foregoing definitions are suitable for use in accordance with my invention, I preferably employ, and have found particularly effective, boron fluoride coordination compounds with ethers, boron fluoride coordination compounds with alcohols, and boron fluoride coordination compounds with nitrogen compounds, more particularly diethylether boron fluoride, phenol boron fluoride, and acetanilide boron fluoride.

In accordance with the invention, as soon as the metallic constituents have had an opportunity to react with BF$_3$, either as a molecule or as a part of the coordination compound added to the oil, a new series of coordination compounds is formed and separates out from the purified oil, in admixture with or in solution in the added agent. The reaction is almost instantaneous when intimate contact is provided. It will be understood that I consider within the scope of my invention the use of any boron fluoride coordination compound and that I do not limit myself to the specific compounds listed above, which are intended merely as illustrative. Furthermore, it is not necessary to use only one of the cordination compounds but mixtures of two or more may also suitably be used, although there is generally no particular need for using mixtures. It will be understood that the quantity of boron fluoride coordination compound used will vary from oil to oil depending upon the nature of the oil to be treated.

The temperature at which I carry out the boron fluoride-coordination compound treatment is in most instances, room temperature or slightly below, e.g. 15° C.

The contact between the boron fluoride coordination compound and the oil needs only to be sufficient to permit the coordination compound to react to effect separation of the undesired constituents from the oil. Generally speaking, the contact time is between one-half minute and thirty minutes, as previously mentioned, although longer contact times may be utilized without departing from the scope of the invention.

As above described, the product resulting from treatment of a hydrocarbon oil in accordance with my process will stratify or can be readily separated into two distinct phases. As may be seen from the following table,

| | Sp. gr. | B. P., ° C. |
|---|---|---|
| BF$_3$(C$_2$H$_5$)$_2$O | 1.125 | 125.7 |
| BF$_3$(CH$_3$)$_2$O | 1.239 | 126.6 |
| BF$_3$HCOOCH$_3$ | 1.45 | 92.5 |
| BF$_3$HCOOC$_2$H$_5$ | 1.346 | 102 (748 mm.) | the commonly available boron fluoride coordination compounds have a relatively high specific gravity compared with the usual hydrocarbon stocks. Their boiling points are also within a relatively low range so that their recovery from the extract for reuse is a relatively simple matter.

As previously mentioned, the reactant phase containing the impurities may be separated from the purified phase by any convenient means, e.g. decantation, centrifuging and the like. Known methods of liquid-liquid extraction either batch-operated or continuous, such as the well-known Podbielniak centrifugal contactor, may be used for the contacting and separation.

All boron fluoride coordination compounds decompose somewhat upon heating even before reaching their boiling point but the decomposition products tend to recombine readily when the temperature is lowered. This property makes it possible to effect efficient recovery of the liquid agents which I employ by simple distillation. However, I prefer to use vacuum distillation, or more conveniently, partial pressure distillation, with the addition of an inert light solvent such as cyclohexane or a fraction of paraffinic or naphthenic hydrocarbon distillate boiling in the range of 60–100° C. to the reactant phase, and then subjecting the mixture to distillation. The recovered agent, such as BF$_3$(C$_2$H$_5$)$_2$O, will distill over together with the light solvent. The distillate immediately separates into two layers. The lower layer being the recovered reagent. The recovery, in the laboratory has been found to be better than 99%, mechanical transfer losses notwithstanding.

Solid boron fluoride coordination compounds which are not readily separated by distillation, e.g. BF$_3$-acetanilide, are advantageously separated by means of an oxygenated solvent, e.g. a ketone, an alcohol or an ether, such as acetone, ethyl alcohol and diethyl ether, which preferentially dissolves the coordination compound. The dissolved boron fluoride coordination compound is suitably recovered by recrystallization by the addition to the solution of a second solvent which is a non-solvent for the coordination compound in known manner, or by evaporation of the solvent.

To remove the traces of BF$_3$ compounds from the treated hydrocarbon stock, a step which in most instances is not necessary, I prefer to percolate the oil through a layer of cryolite or sodium fluoride with or without the admixture of percolation clay. The last trace of BF$_3$ forms sodium fluoborate which can be easily leached out from the bed by water and recovered. Alternatively, distillation and/or partial pressure distillation can be used and BF$_3$ compounds recovered.

The treatment with the boron fluoride coordination compound is advantageously carried out in a corrosion resistant vessel of any convenient type provided with proper contacting devices and, advantageously, corrosion resistant apparatus is employed in the recovery of the coordination compound from the purified and reactant phases. However, the reagent is basically non-corrosive if moisture is excluded from the system.

The severe catalyst poisoning encountered in the past in catalytic reforming operations in treating naphthas and like feed stocks which normally contain substantial quantities of metallic compounds, particularly lead and arsenic compounds, is avoided in accordance with my process of treatment. Therefore, the activity or the life of the catalyst is much greater than it would have been without my treatment, and the necessity for regeneration and replacement becomes less frequent than in conventional practice.

While, as mentioned, the invention is particularly applicable in the treatment of catalytic reforming charge stocks, it is generally effective in treating any light hydrocarbon oil containing metallic contaminants and is generally applicable to hydrocarbon oil fractions boiling within the approximate range of 30° F. and 600° F. and containing metallic constituents, particularly compounds of lead and arsenic.

The following specific examples will serve to illustrate more fully the operation and advantages of the process of the present invention.

Example I

To 100 parts by volume of standard naphtha (B.R. 120° F. to 400° F.) containing 100 parts per billion of lead was added 1 part by volume of boron fluoride-diethyl ether. The mixture was shaken vigorously for 3 minutes and allowed to settle for 5 minutes. The treated naphtha was then decanted from the boron fluoride coordination compound, which formed a lower stratum. The lead content of the thus-treated naphtha was found to be 10 parts per billion.

Example II

A sample of a straight-run distillate (B.R. 100° F. to 350° F.) to be used as platformer charge and having an NPA color of 5 and containing 180 parts per billion of lead was treated with 15% by volume of a boron-fluoride-diethyl ether coordination compound in the manner described in Example I. The treated distillate, after separation by decantation from the lower reactant phase, was distilled to remove any boron-fluoride coordination compound present. The color was improved considerably and the lead content dropped to 10 parts per billion. A blank test, i.e. the original sample distilled in the same manner but without the boron-fluoride coordination compound treatment contained the same amount of lead it had before distillation.

Example III 75 parts by weight of a standard naphtha (B.R. 120° F. to 400° F.) containing 100 parts per billion of lead was shaken for 10 minutes with 5 parts by weight of a $BF_3$ urea coordination compound and the reaction mixture was filtered. The filtrate which was the purified phase consisting essentially of purified naphtha, had a lead content of 10 parts per billion.

Example IV

The process of Example III was repeated, using another sample of the same naphtha, but using 5 parts by weight of $BF_3$-dimethyl formamide. The recovered purified naphtha had a lead content of 10 parts per billion.

It will be obvious to those skilled in the art that various changes and modifications may be made in the process hereinabove described without departing from the scope of the invention as defined in the appended claims and it is intended, therefore, that all matter contained in the foregoing description shall be interpreted as illustrative only and not in a limiting sense.

This application is a continuation-in-part of my copending application, Serial No. 260,313, filed December 6, 1951, now U.S. Patent No. 2,745,792.

What I claim and desire to secure by Letters Patent is:

1. A process of treating a light hydrocarbon oil stock of the type used as feed for catalytic reforming operations and containing metallic compounds having a poisoning action upon catalysts used in catalytic reforming which comprises, intimately mixing said light hydrocarbon oil stock at substantially atmospheric pressure with a treating agent consisting essentially of a coordination compound of boron fluoride, said treating agent being employed in a quantity of at least about 0.1% by volume, causing the intimately mixed stock to separate into a reactant phase containing the major proportion of the treating agent and the metallic compounds separated thereby and a purified phase, and separating said purified phase from said reactant phase.

2. A process of treating a light hydrocarbon oil stock of the type used as feed for catalytic reforming operations and containing metallic compounds having a poisoning action upon catalysts used in catalytic reforming which comprises, intimately mixing said light hydrocarbon oil stock at substantially atmospheric pressure for ½ minute to 30 minutes with a treating agent consisting essentially of a coordination compound of boron fluoride, said treating agent being employed in a quantity of at least about 0.1% by volume, causing the intimately mixed stock to separate into a reactant phase containing the major proportion of the treating agent and the metallic compounds separated thereby and a purified phase, and separating said purified phase from said reactant phase.

3. A process of treating a light hydrocarbon oil stock of the type used as feed for catalytic reforming operations and containing metallic compounds having a poisoning action upon catalysts used in catalytic reforming which comprises, intimately mixing said light hydrocarbon oil stock at substantially atmospheric pressure with a treating agent consisting essentially of a coordination compound of boron fluoride, said treating agent being employed in a quantity of about 0.1% to 25% by volume, causing the intimately mixed stock to separate into a reactant phase containing the major proportion of the treating agent and the metallic compounds separated thereby and a purified phase, and separating said purified phase from said reactant phase.

4. A process of treating a light hydrocarbon oil stock of the type used as feed for catalytic reforming operations and containing metallic compounds having a poisoning action upon catalysts used in catalytic reforming which comprises, intimately mixing said light hydrocarbon oil stock at substantially atmospheric pressure at a temperature between about 15° C. and 60° C. with a treating agent consisting essentially of a coordination compound of boron fluoride, said treating agent being employed in a quantity of at least about 0.1% by volume, causing the intimately mixed stock to separate into a reactant phase containing the major proportion of the treating agent and the metallic compounds separated thereby and a purified phase, and separating said purified phase from said reactant phase.

5. A process of treating a light hydrocarbon oil stock of the type used as feed for catalytic reforming operations and containing metallic compounds having a poisoning action upon catalysts used in catalytic reforming which comprises, intimately mixing said light hydrocarbon oil stock at substantially atmospheric pressure at a temperature between about 15° C. and 60° C. for ½ minute to 30 minutes with a treating agent consisting essentially of a coordination compound of boron fluoride, said treating agent being employed in a quantity of about 0.1% to 25% by volume, causing the intimately mixed stock to separate into a reactant phase containing the major proportion of the treating agent and the metallic compounds separated thereby and a purified phase, and separating said purified phase from said reactant phase.

6. A process of treating a light hydrocarbon oil stock of the type used as feed for catalytic reforming operations and containing metallic compounds having a poisoning action upon catalysts used in catalytic reforming which comprises, intimately mixing said light hydrocarbon oil stock at substantially atmospheric pressure at a temperature between about 15° C. and 60° C. for ½ minute to 30 minutes with a treating agent consisting essentially of a coordination compound of boron fluoride, said treating agent being employed in a quantity of at least about 0.1% by volume, causing the intimately mixed stock to separate into a reactant phase containing the major proportion of the treating agent and the metallic compounds separated thereby and a purified phase, and separating said purified phase from said reactant phase.

7. A process of treating a light hydrocarbon oil stock of the type used as feed for catalytic reforming operations and containing metallic compounds having a poisoning action upon catalysts used in catalytic reforming which comprises, intimately mixing said light hydrocarbon oil stock at substantially atmospheric pressure at a temperature between about 15° C. and 60° C. for ½ minute to 30 minutes with a treating agent consisting essentially of a coordination compound of boron fluoride, said treating agent being employed in a quantity of at least about 0.1% by volume, causing the intimately mixed stock to separate into a reactant phase containing the major proportion of the treating agent and the metallic compounds separated thereby and a purified phase, and separating said purified phase from said reactant phase, and recovering the boron fluoride coordination compound from said reactant phase.

References Cited in the file of this patent

UNITED STATES PATENTS

| | | |
|---|---|---|
| 2,495,851 | Lien et al. | Jan. 31, 1950 |
| 2,611,735 | Coons | Sept. 23, 1952 |
| 2,745,792 | Shiah | May 15, 1956 |